US008849962B2

(12) United States Patent
Chang

(10) Patent No.: US 8,849,962 B2
(45) Date of Patent: Sep. 30, 2014

(54) IMAGE FORMING APPARATUS AND METHOD OF CONTROLLING THE SAME

(75) Inventor: Chi Tack Chang, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 398 days.

(21) Appl. No.: 11/898,336

(22) Filed: Sep. 11, 2007

(65) Prior Publication Data

US 2008/0140812 A1   Jun. 12, 2008

(30) Foreign Application Priority Data

Dec. 12, 2006  (KR) .......................... 10-2006-126382

(51) Int. Cl.
*G06F 15/177* (2006.01)
*H04L 12/24* (2006.01)

(52) U.S. Cl.
CPC ............ *H04L 41/22* (2013.01); *H04L 41/0866* (2013.01)
USPC ....................................................... 709/220

(58) Field of Classification Search
USPC ........ 709/220–229; 358/1.15, 1.16, 500, 504, 358/505, 400, 401, 404
See application file for complete search history.

(56) References Cited

U.S. PATENT DOCUMENTS

| 5,819,042 | A  | * | 10/1998 | Hansen ......................... 709/222 |
| 6,295,556 | B1 | * | 9/2001  | Falcon et al. ................. 709/220 |
| 6,424,424 | B1 | * | 7/2002  | Lomas et al. ................ 358/1.14 |
| 6,493,751 | B1 | * | 12/2002 | Tate et al. ..................... 709/221 |
| 7,239,868 | B2 | * | 7/2007  | Furukawa et al. ............ 455/420 |
| 7,260,730 | B2 | * | 8/2007  | Sakaue ......................... 713/310 |
| 7,457,843 | B2 | * | 11/2008 | Otsuka ......................... 709/206 |
| 7,685,264 | B2 | * | 3/2010  | Tumsi Dayakar et al. .... 709/221 |
| 2001/0019953 | A1 | * | 9/2001  | Furukawa et al. ............ 455/420 |
| 2001/0023446 | A1 | * | 9/2001  | Balogh ......................... 709/229 |
| 2002/0048052 | A1 | * | 4/2002  | Hayashi ....................... 358/450 |
| 2002/0059434 | A1 | * | 5/2002  | Karaoguz et al. ............ 709/228 |
| 2002/0147027 | A1 | * | 10/2002 | Alford et al. ................. 455/557 |
| 2003/0002077 | A1 | * | 1/2003  | Shima ......................... 358/1.15 |
| 2003/0069947 | A1 | * | 4/2003  | Lipinski ....................... 709/220 |
| 2004/0064532 | A1 | * | 4/2004  | Schacht et al. ............... 709/221 |
| 2004/0199651 | A1 | * | 10/2004 | Kobayashi ................... 709/230 |
| 2004/0210649 | A1 | * | 10/2004 | Bhogal et al. ................ 709/222 |
| 2005/0066072 | A1 | * | 3/2005  | Nakamura ....................... 710/8 |
| 2005/0148326 | A1 | * | 7/2005  | Nogawa et al. .............. 455/420 |
| 2006/0105714 | A1 | * | 5/2006  | Hall et al. .................... 455/41.3 |

(Continued)

FOREIGN PATENT DOCUMENTS

| JP | 2001-158157 | * | 6/2001 | ............... G06F 3/12 |
| JP | 2001158157  |   | 6/2001 | |

OTHER PUBLICATIONS

Korean Office Action dated Nov. 13, 2012 issued in KR Application No. 10-2006-0126382.

*Primary Examiner* — Brendan Higa
(74) *Attorney, Agent, or Firm* — Stanzione & Kim, LLP

(57) ABSTRACT

An image forming apparatus and a method of controlling the same including a networking function includes checking the connection of a network cable, and displaying a screen to configure a network when the connection of the network cable is checked, thus allowing a user to circumvent time-consuming steps by providing a user with direct access to a menu to configure a network upon connection of a network cable to the image forming apparatus, thereby allowing the user to more easily configure the network and with increased efficiency.

19 Claims, 12 Drawing Sheets

(56) References Cited

U.S. PATENT DOCUMENTS

| | | | |
|---|---|---|---|
| 2006/0143299 A1* | 6/2006 | Jones et al. | 709/227 |
| 2006/0230420 A1* | 10/2006 | Kawai et al. | 725/105 |
| 2006/0268335 A1* | 11/2006 | Okada | 358/1.15 |
| 2007/0064268 A1* | 3/2007 | Hino | 358/1.15 |
| 2007/0088780 A1* | 4/2007 | Sato et al. | 709/204 |
| 2010/0027051 A1* | 2/2010 | Hamilton et al. | 358/1.15 |

* cited by examiner

IMAGE FORMING APPARATUS AND METHOD OF CONTROLLING THE SAME

CROSS-REFERENCE TO RELATED APPLICATIONS

This application claims the priority of Korean Patent Application No. 2006-126382, filed on Dec. 12, 2006 in the Korean Intellectual Property Office, the disclosure of which is incorporated herein by reference in its entirety.

BACKGROUND OF THE INVENTION

1. Field of the Invention

The present general inventive concept relates to an image forming apparatus, and more particularly to an image forming apparatus and a method of controlling the same, which are capable of easily configuring a network for the image forming apparatus including a networking function.

2. Description of the Related Art

Recently, in home or offices, an image forming apparatus is networked via a local area network (LAN) to allow a plurality of users are able to commonly share use of the image forming apparatus in a transmission control protocol/Internet protocol (TCP/IP) based network environment. Accordingly, the image forming apparatus has a network card and is networked by connecting a network cable to the network card.

In order to network an image forming apparatus in such a TCP/IP network environment, it is necessary to execute a network configuring operation for the image forming apparatus. A network configuring operation may be used to configure an IP address of a device on a network. As illustrated in FIG. 1, a user operates an input unit and scrolls through the menus until a "Network" menu appears. When the "Network" menu appears and is selected by the user, a variety of sub-menus appears including a "TCP/IP" sub-menu. When the "TCP/IP" sub-menu is selected, the variety of sub-menus appears again including a "Static" sub-menu. Upon selecting the "Static" sub-menu, an "IP Address" item for inputting an IP address appears. After the IP address is configured by the "IP Address" item, a subnet mask and a basic gateway are configured.

In order to allow the user to select the "IP Address" item, the input unit must be operated at least five times. The number of operations is restricted to the configuration of the IP address. If the configurations of the subnet mask and the basic gateway and other additional configurations of a network (scan-to-email or net scan) are included, the number of operations necessary for the configuration of the network increases.

Conventionally, in order to allow a user to configure a network for an image forming apparatus, several menus must be operated such that a menu for configuring the network is selected. Thus, conventional devices lack convenience and ease of use.

SUMMARY OF THE INVENTION

The present general inventive concept provides an image forming apparatus and a method of controlling the same, which are capable of easily allowing a user to configure a network for the image forming apparatus.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of controlling an image forming apparatus including a networking function, the method including checking a connection of a network cable, and displaying a screen to configure a network when the connection of the network cable is checked.

The configuration of the network may include at least one of the configuration of an IP address, the configuration of a subnet mask, and the configuration of a gateway.

The method may further include checking existing network configuration information to determine whether the configuration of the network is necessary when the connection of the network cable is checked, and displaying the screen for the configuration of the network when the configuration of the network is necessary.

The method may further include displaying the existing network configuration information when the configuration of the network is not necessary.

The configuration of the network may be displayed according to a user command to change the configuration of the network after the existing network configuration information is displayed.

The foregoing and/or other aspects and utilities of the present general inventive concept may further be achieved by providing a method of controlling an image forming apparatus including a networking function, the method including checking a connection of a network cable, checking a configuration of a network and determining a factor necessary for the configuration of the network when the connection of the network cable is checked, displaying a screen for the configuration of the network for the determined factor, and configuring the network for the determined factor according to a user command.

The factor necessary for the configuration of the network may include at least one of an IP address, a subnet mask, and a gateway.

If the factor necessary for the configuration of the network does not exist, then existing network configuration information may be displayed.

The screen for the configuration of the network may be displayed according to the user command to change the configuration of the network after the existing network configuration information is displayed.

The foregoing and/or other aspects and utilities of the present general inventive concept may also be achieved by providing an image forming apparatus including a networking function, including a network interface unit to check a connection of a network cable, a key input unit to allow a user to input a command and a network configuration value, a display unit to display a screen and network configuration information, and an image formation control unit to check a configuration of a network to determine a factor necessary for the configuration of the network, to display a screen for the configuration of the network for the determined factor, and to configure the network on the basis of the network configuration value inputted by the user when the connection of the network cable is checked.

The factor necessary for the configuration of the network may be at least one of an IP address, a subnet mask, and a gateway.

The apparatus may include a storage unit to store the network configuration information, wherein the image formation control unit stores the network configuration information in the storage unit after the configuration of the network.

The image formation control unit may display existing network configuration information stored in the storage unit when the factor necessary for the configuration of the network does not exist.

The image formation control unit may display a screen for the configuration of the network according to a user command for changing the configuration of the network after displaying the existing network configuration information.

The foregoing and/or other aspects and utilities of the present general inventive concept may also be achieved by providing a network cable connected to the image forming apparatus, and a display screen to display the configuration of a network when the network cable is connected to the image forming apparatus.

The foregoing and/or other aspects and utilities of the present general inventive concept may also be achieved by providing a method of controlling an image forming apparatus including a networking function, the method including connecting a network cable, determining network configuration information when the network cable is connected, and displaying the network configuration information when the network information is determined.

The determining network configuration information may be prompted by connecting the network cable.

The completing the incomplete network configuration set-up task may be prompted by a user.

The completing the incomplete network configuration set-up task may be prompted by a controller.

The method may include displaying an incomplete network configuration set-up task, completing the incomplete network configuration set-up task, and determining whether an additional incomplete network configuration set-up task exists.

If the additional incomplete network configuration set-up task exists, then the additional incomplete network configuration set-up task may be completed.

If the additional incomplete network configuration set-up task does not exist, then the network configuration information may be stored.

The incomplete network configuration set-up task may be one of an IP address configuration set-up task, a subnet mask configuration set-up task, and a display gateway configuration set-up task.

The foregoing and/or other aspects and utilities of the present general inventive concept may also be achieved by providing an interface unit to check a connecting of a network cable, a unit to generate a network configuration factor when the network cable is connected, and a display to display the network configuration factor when the network configuration factor is generated.

The foregoing and/or other aspects and utilities of the present general inventive concept may also be achieved by providing a computer readable medium containing a computer-readable code as a program to execute a method of controlling an image forming apparatus including a networking function, the method comprising checking a connection of a network cable, and displaying a screen to configure a network when the connection of the network cable is checked.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
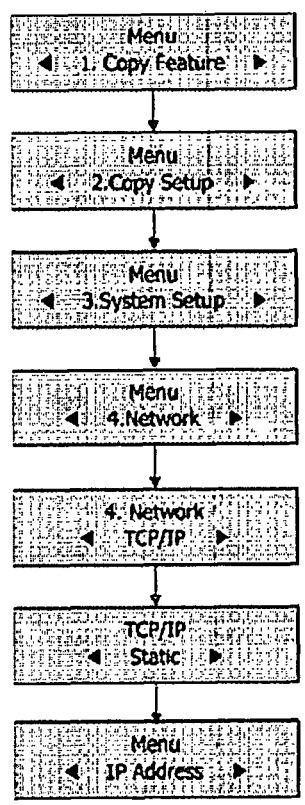
FIG. 1 is a view showing a general method of configuring a network for an image forming apparatus.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

Figure 2:
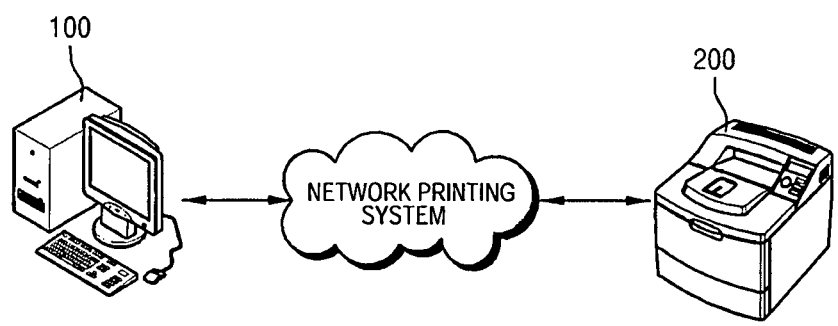
FIG. 2 is a view showing a network printer system applied to an image forming apparatus according to an embodiment of the present general inventive concept.

FIG. 2 is a view showing the configuration of a network printer system applied to an image forming apparatus according to an embodiment of the present general inventive concept.

As illustrated in FIG. 2, the network printer system includes a host computer 100 and an image forming apparatus 200 connected to the host computer 100 via a network. The image forming apparatus 200 is connected to a network environment, which is connected to the host computer 100 via a network cable, thereby allowing a printing operation to be performed according to a print command from the host computer 100. The host computer 100 may be one of a plurality of computers connected to the image forming apparatus 200.

Figure 3:
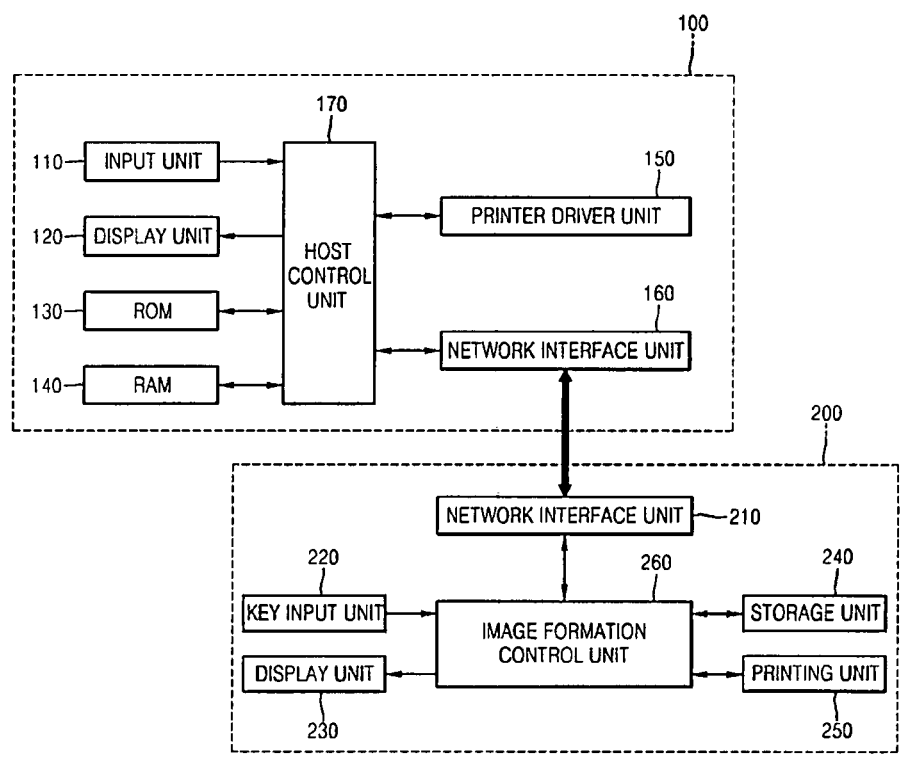
FIG. 3 is a schematic block view showing a configuration of the image forming apparatus of FIG. 2.

First, the configuration of the host computer 100 will now be described with reference to FIG. 3. The host computer 100 includes an input unit 110, a display unit 120, a read only memory (ROM) 130, a random access memory (RAM) 140, a printer driver unit 150, a network interface unit 160, and a host control unit 170.

The input unit 110 is a user interface unit that allows a user to configure a variety of functions supported by the host computer 100. The input unit 110 may be a keyboard and/or a mouse, but the input unit 110 can be any device that allows a user to interface with the input unit 110, such as, but not limited to a touch screen. The user operates the keyboard and/or the mouse to input a variety of commands to the host computer 100, which are necessary for operating a system. The variety of input commands is transmitted to the host control unit 170 via a system bus.

The display unit 120 is a user interface unit for allowing the user to check or verify information on a variety of programs implemented in the host computer 100 with characters and graphics displayed by the display unit 120. The display unit 120 may be a cathode ray tube (CRT) or a liquid crystal display (LCD), but the display unit 120 can be any device that allows a user to interface with the host computer 100, such as, but not limited to a plasma display screen. The user can verify the implemented state and result of the program using a user interface (UI) window displayed by the display unit 120.

The ROM 130 is a non-volatile memory which retains stored contents even when the host computer 100 is turned off. The ROM 130 stores a control program, such as an operating system (OS) necessary for implementing the functions of the host computer 100, and a variety of application programs.

The RAM 140 is a volatile memory which stores a variety of data which is generated during executing the program.

The printer driver unit 150 implements a printer driver to control the printing operation of the image forming apparatus 100 and converts a text file generated by an application program into print data.

The network interface unit 160 implements an interface with the image forming apparatus 200.

The host control unit 170 reads the control program stored in the ROM 130 and controls the operation of the host computer 100. The host control unit 170 performs a variety of functions via an application program selected by the user and stores the print data generated during the execution of the application program in the RAM 140, such as a documentor. In addition, the host control unit 170 controls the printer driver unit 150 to drive the printer driver.

Next, the configuration of the image forming apparatus 200 will be described with reference to FIG. 3. The image forming apparatus 200 includes a network interface unit 210, a key input unit 220, a display unit 230, a storage unit 240, a printing unit 250, and an image formation control unit 260.

The network interface unit 210 includes a network card, is connected to the network environment connected to the host computer 100 via the network cable, for example, the network interface unit 160 of the host computer 100 and performs a data communication function between the host computer 100 and the image forming apparatus 200. In particular, the network interface unit 210 checks the connection of the network cable, such as a LAN cable. When the user connects the network cable to the network interface unit 210, the network interface unit 210 informs the image formation control unit 260 that the network cable is connected to the network interface unit 210 that may include an internal chip thereof.

The key input unit 220 allows the user to operate keys such that the image forming apparatus can be controlled. In particular, the key input unit 220 allows the user to select a menu for the configuration of the network and/or provides an input function of the selected menu.

The display unit 230 displays information for the configuration of the network and the state of the image forming apparatus 200 on the LCD.

The storage unit 240 stores a control program for controlling the image forming apparatus 200 and includes, but is not limited to, current network configuration information of the image forming apparatus 200.

The printing unit 250 prints a print image on paper using the print data according to the print command transmitted from the host computer 100.

The image formation control unit 260 controls the printing unit 250 according to the print command transmitted from the host computer 100 and prints the print image on the paper and includes, but is not limited to, checking or otherwise verifying the connection of the network cable via the network interface unit 210. When the network cable is connected, the image formation control unit 260 determines whether the configuration of the network is necessary. Such network configuration may include, but is not limited to, the configuration of an IP address, the configuration of a subnet mask, or the configuration of a gateway. If the configuration of the network is determined to be necessary, then a screen for the configuration of the network is displayed via the display unit 230 to allow the user to configure the network. If the configuration of the network is not necessary, then the current network configuration information is displayed via the display unit 230 to allow the user to check the current network configuration information.

Figure 4:
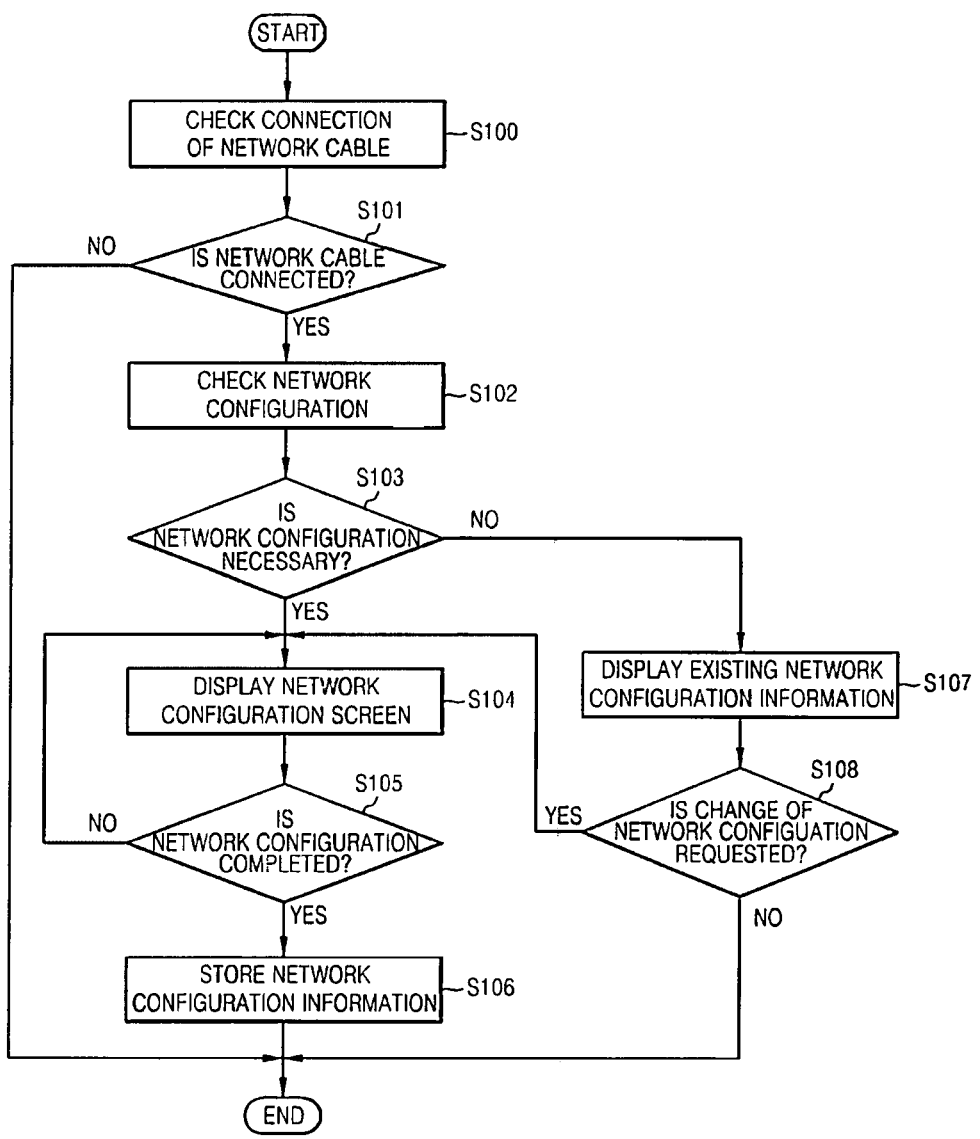
FIG. 4 is a flowchart illustrating a method of configuring a network for the image forming apparatus according to an embodiment of the present general inventive concept.

FIG. 4 is a flowchart illustrating a method of controlling the image forming apparatus according to the embodiment of the present general inventive concept. The method of configuring the network for the image forming apparatus according to the embodiment of the present general inventive concept will now be described with reference to FIGS. 2-4. First, the image formation control unit 260 checks the connection of the network cable via the network interface unit 210 in Operation S100.

In Operation S101, it is determined whether the network cable is connected according to the result of Operation S100. If the network cable is connected, then the configuration of the network is checked in Operation S102. If the network cable is not connected, then the control method is finished.

In Operation S103, it is determined whether the configuration of the network is necessary according to the checked result of Operation S102. If the configuration of the network is necessary, then a screen for the configuration of the network is displayed via the display unit 230 in Operation S104. At this time, necessary items or factors, such as the IP address, the subnet mask, and the gateway, and additional items or factors, such as scan-to-email and net scan, in the configuration of the network are separately determined and are separately displayed on the screen for the configuring the network. When the user inputs desired network configuration values via the key input unit 220, the image formation control unit 260 configures the network on the basis of the inputted network configuration values.

In Operation S105, it is determined whether the configuration of the network is completed. If the configuration of the network is not completed, then the method progresses to Operation S104 to complete the configuration of the network. If the configuration of the network is completed, then the network configuration information configured by the user is stored in the storage unit 240 in Operation S106, at which point the control method is finished.

If the configuration of the network is not necessary as the determined result of Operation S103, then the existing network configuration information is displayed via the display unit 230 in Operation S107, at which point it is determined whether a command for requesting the configuration of the network to be changed is input via the key input unit 220 in Operation S108. If the configuration of the network is requested to be changed as the determined result of Operation S108, then the method progresses from Operation S108 to Operation S104. If the configuration of the network is not requested to be changed as the determined result of Operation S108, then the control method is finished.

Figure 5:
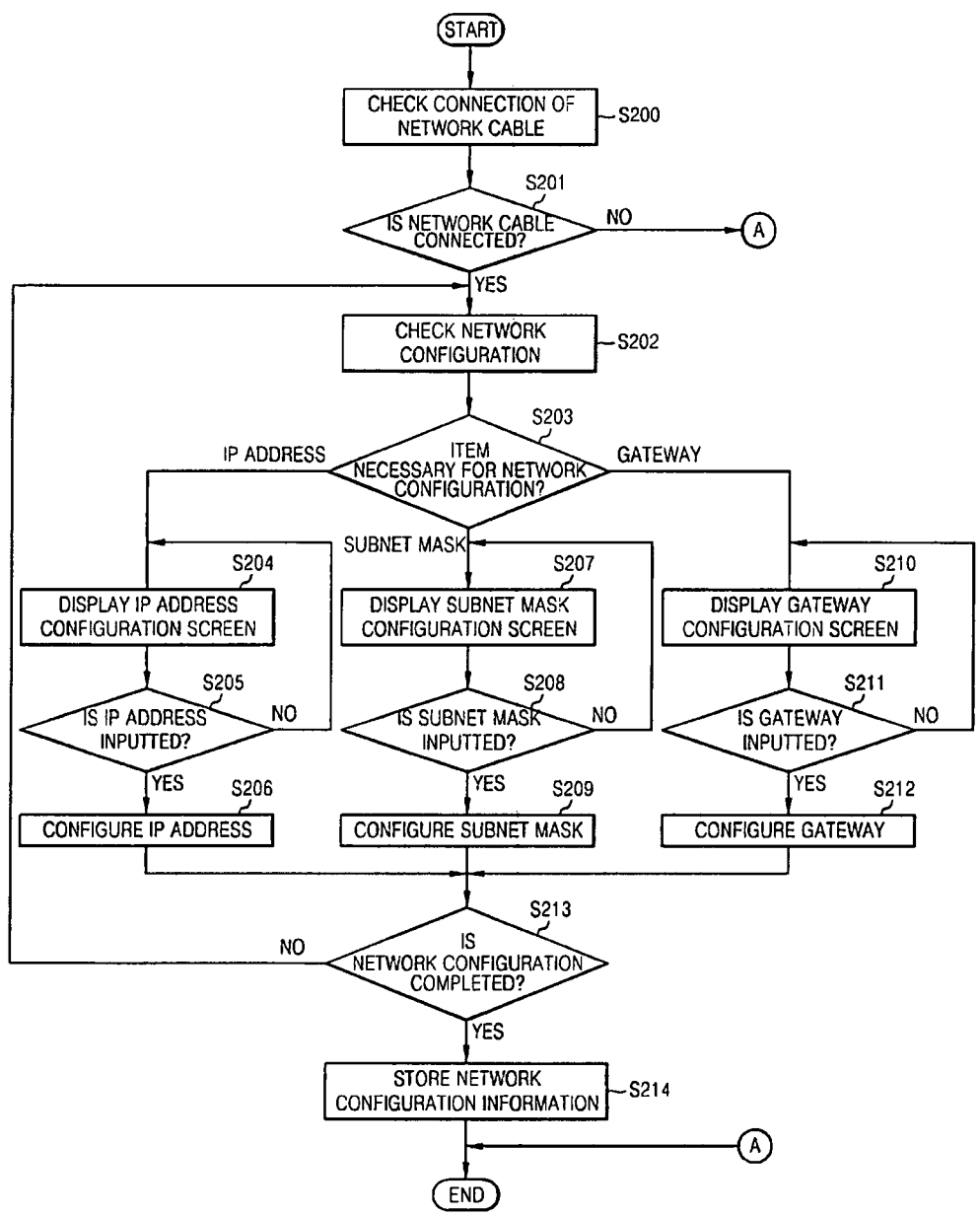
FIG. 5 is a flowchart illustrating the method of configuring the network illustrated in FIG. 4 in more detail.
Figure 6:
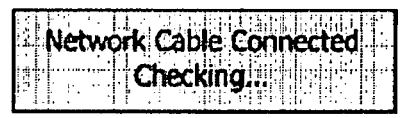
FIG. 6 is an example of a screen to display that a connection of a network cable is being checked.

FIG. 5 is a flowchart illustrating the method of configuring the network illustrated in FIG. 4 in more detail. The method of configuring the network will now be described with reference to FIGS. 2-5. First, the image formation control unit 260 checks the connection of the network cable via the network interface unit 210 in Operation S200.

In Operation S201, it is determined whether the network cable is connected according to the checked result of Operation S200. If the network cable is connected, then the configuration of the network is checked in Operation S202. If the network is not connected, then the control method is finished.

In Operation S203, it is determined whether an item or factor is necessary for the configuration of the network, such as the IP address, the subnet mask; or the gateway according to the checked result of Operation S202.

If the determined result of Operation S203 is that the factor necessary for the configuration of the network is the IP address, then a screen for the configuration of the IP address is displayed via the display unit 230 in Operation S204. If the user inputs an IP address value to be configured via the key input unit 220 in Operation S205, then the IP address is configured on the basis of the IP address value inputted by the user in Operation S206.

If the determined result of Operation S203 is that the factor necessary for the configuration of the network is the subnet mask as, then a screen for the configuration of the subnet mask is displayed via the display unit 230 in Operation S207. If the user inputs a subnet mask value to be configured via the key input unit 220 in Operation S208, then the subnet mask is configured on the basis of the subnet mask value inputted by the user in Operation S209.

If the determined result of Operation S203 is that the factor necessary for the configuration of the network is the gateway as, then a screen for the configuration of the gateway is displayed via the display unit 230 in Operation S210. If the user inputs a gateway value to be configured via the key input unit 220 in Operation S211, then the gateway is configured on the basis of the gateway value inputted by the user in Operation S212.

In Operation S213, it is determined whether the configuration of the network is completed. If the determined result of Operation S213 is that the configuration of the network is not completed, then the method progresses to Operation S202 and Operation S202 is performed. If the determined result of Operation S213 is that the configuration of the network is completed, then the network configuration information configured by the user is stored in the storage unit 240 in Operation S214, at which point the control method is finished.

Figure 7:
FIG. 7 is an example of an IP address configuration information screen.
Figure 8:
FIG. 8 is another example of the IP address configuration information screen of FIG. 7.
Figure 9:
FIG. 9 is a view showing a screen to check when a user wants to change the configuration of an IP address.

The operation of the image forming apparatus 200 will be described using the configuration of the IP address as an example of the configuration of the network. When the network cable is connected to the image forming apparatus, the image forming apparatus 200 displays a screen to allow a user to observe that the connection of the network cable is being checked. The configuration of the network is checked to determine whether the IP address is normally configured. If the IP address is normally configured, then an IP address configuration information screen, as illustrated by FIG. 7, or an IP address configuration information screen, as illustrated by FIG. 8, is displayed according to an IP address configuring method such that the user checks the IP address configuration information. Accordingly, the user can observe the IP address, such as illustrated in FIG. 8 as 10.88.195.68, and the IP address allocation method, such as illustrated in FIG. 8 as a dynamic host configuration protocol (DHCP) or a static IP. At this point, a screen, such as illustrated in FIG. 9, is displayed to inquire as to whether the user wants to change the configuration of the IP address. If the user wants to change the configuration of the IP address, then an IP address configuration screen of FIG. 10 is displayed to allow the user to input the IP address.

Figure 10:
FIG. 10 is an example of an IP address configuration screen.

If the IP address is not normally configured, then the IP address configuration screen of FIG. 10 is displayed. Accordingly, the user can directly input a desired IP address and configure the IP address without operating several menus.

Figure 11:
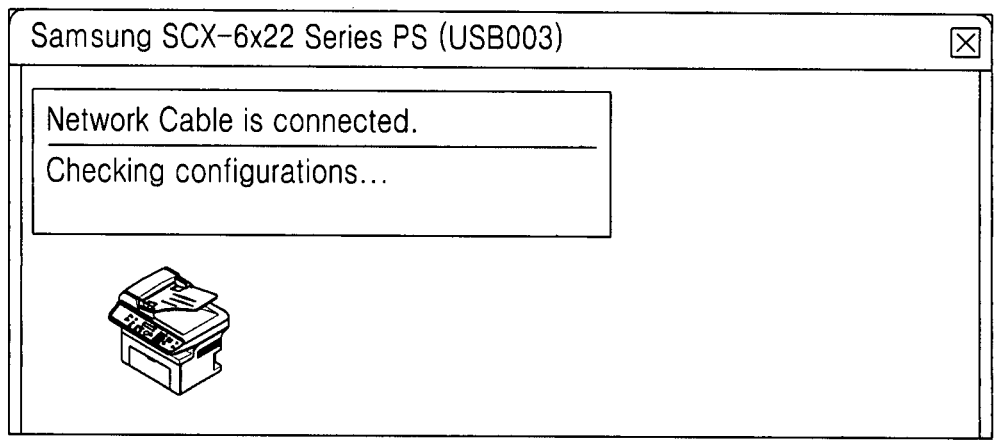
FIGS. 11 and 12 are an example of a network configuration screen in a computer connected to the image forming apparatus according to an embodiment of the present general inventive concept via a local cable.
Figure 12:
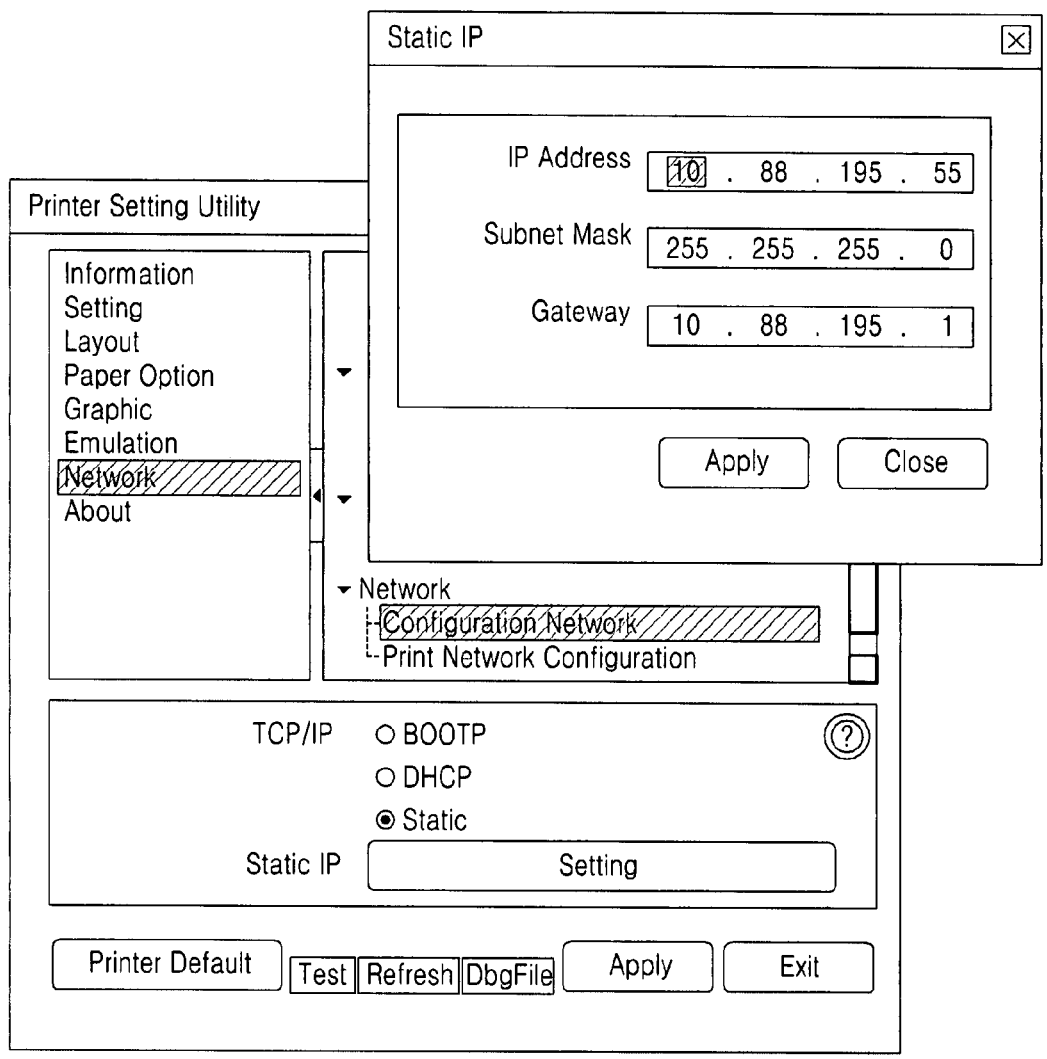

Although the network configuring operation, which is performed while the user views the display unit provided in the image forming apparatus is described in the above-described embodiment, the present general inventive concept is not limited to this embodiment. When a user computer is connected to the image forming apparatus via a local cable, such as a universal serial cable or a parallel cable, it is foreseen that the network may be configured on the screen of the user computer. In this case, the image forming apparatus may include software for checking the connection of the local cable and a network configuring program which can be executed on the user computer. FIGS. 11 and 12 illustrate a network configuration screen in a computer connected to the image forming apparatus via a local cable. It is foreseen that a user may be prompted to input necessary network configuration data in order for the user to prompt network configuration and/or a controller may be loaded or otherwise equipped with a wide spectrum of various network configuration data applicable to common devices in order to prompt network configuration. The controller may be equipped with the necessary network configuration data during and/or after manufacture to enable the controller, upon determining an incomplete network configuration, to automatically prompt network configuration with or without prompting by a user.

Various embodiments of the present general inventive concept can be embodied as computer readable codes on a computer readable recording medium. The computer readable recording medium may include any data storage device suitable to store data that can be thereafter read by a computer system. Examples of the computer readable recording medium include, but are not limited to, a read-only memory (ROM), a random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Various embodiments of the present general inventive concept may also be embodied in hardware or in a combination of hardware and software. For example, the method of controlling the image forming apparatus 200 may be embodied in software, in hardware, or in a combination thereof. In various embodiments, the method of controlling the image forming apparatus 200 may be embodiment as computer readable codes on a computer readable recording medium to perform operations, such as the operations illustrated in FIGS. 4 and 5.

As described above, according to the present general inventive concept, since the user can circumvent time-consuming steps by providing the user with direct access to a menu for configuring the network upon connecting the network cable to the image forming apparatus, the user can more easily configure the network and with increased efficiency.

According to the present general inventive concept, although the additional configuration of the network is necessary, the image forming apparatus informs the user of the additional configuration of the network in order to reduce the time and effort that the user spends searching for the network-configuration menu.

According to the present general inventive concept, the user can check or otherwise verify network information configured in the image forming apparatus by simply connecting the network cable.

Although a few embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A method of controlling a printer including a networking function, the method comprising:
checking with the printer a connection of a network cable to the printer to connect the printer to a host computer;
checking with the printer a configuration of a network corresponding to the network cable and determining whether configuration of at least one network factor is necessary for the printer to communicate with the network via the network cable, the at least one network factor including at least one of the configuration of an IP address, the configuration of a subnet mask, and the configuration of a gateway;
when it is determined that a configuration of at least one network factor is necessary, displaying a screen to prompt a user to configure the at least one network factor;
when it is determined that the configuration of the at least one network factor is not necessary, automatically prompting the user of the at least one network factor by displaying the at least one network factor of existing network configuration information along with a query to inquire whether the user desires to change the at least one network factor and determining whether a request to change the at least one network factor has been received to allow a user to change the at least one network factor; and
configuring the at least one network factor according to a user input corresponding to the displayed screen.

2. The method according to claim 1, wherein the determining whether configuration of the at least one network factor is necessary includes checking existing network configuration information when the network cable is connected to the printer.

3. The method according to claim 1, further comprising:
determining whether the displayed existing network configuration information is to be modified.

4. The method according to claim 3, further comprising:
displaying the screen to prompt the user to configure the at least one network factor when, based upon receiving a user input, it is determined that the displayed at least one network factor of existing network configuration information is to be modified.

5. A printer including a networking function, the printer comprising:
a network interface to check a connection of a network cable to connect the printer to a host computer;
a key input unit to receive from a user a command and a network configuration value;
a display unit to display a screen and network configuration information; and
an image formation controller to check a configuration of a network to determine whether configuration of at least one network factor is necessary for the printer to communicate with the network, the at least one network factor being at least one of an IP address, a subnet mask, and a gateway, to display a screen to prompt a user to input a value for the at least one network factor when it is determined that configuration of the at least one network factor is necessary for the printer to communicate with the network, to configure the network according to the network factor value inputted by the user in response to the display of the screen to prompt the user to input the value for the at least one network factor, and to determine whether a request to change the network configuration has been received to allow the user to change the network configuration, wherein the image formation controller automatically prompts the user of the at least one network factor by displaying the at least one network factor of existing network configuration information along with a query to inquire whether the user desires to change the at least one network factor when the image formation controller determines that configuration of the at least one network factor is not necessary for the printer to communicate with the network.

6. The printer according to claim 5, further comprising:
a storage unit to store the network configuration information,
wherein the image formation controller stores the network configuration information in the storage unit after the configuration of the network.

7. The printer according to claim 5, wherein the image formation controller displays a screen to configure the at least one network factor in response to a user command to change the configuration of the network after the image formation controller controls the display to display the existing network configuration information.

8. A method of controlling a printer including a networking function, the method comprising:
connecting a network cable between a host computer and the printer;
determining with the printer network configuration information when the network cable is first connected;
displaying the network configuration information when the network information is determined; and
determining with the printer whether completion of at least one network configuration set-up task is necessary to allow the printer to communicate with the network, the at least one network configuration set-up task including at least one of an IP address configuration set-up task, a subnet mask configuration set-up task, and a gateway configuration set-up task,
wherein, when it is determined that completion of the at least one network configuration set-up task is not necessary, automatically prompting a user of the at least one network factor by displaying the at least one network configuration set-up task of existing network configuration information along with a query to inquire whether the user desires to change the at least one network factor and determining whether a request to change the at least one network factor has been received to allow the user to change the at least one network factor.

9. The method of claim 8, wherein the determining whether completion of at least one network configuration set-up task is necessary includes being prompted to complete the at least one network configuration set-up task upon connecting the network cable.

10. The method of claim 8, further comprising:
displaying an incomplete network configuration set-up task;
completing the incomplete network configuration set-up task; and
determining whether an additional incomplete network configuration set-up task exists.

11. The method of claim 10, wherein the completing the incomplete network configuration set-up task is prompted by a user.

12. The method of claim 10, wherein the completing the incomplete network configuration set-up task is prompted by a controller.

13. The method of claim 10, wherein the additional incomplete network configuration set-up task exists and the additional incomplete network configuration set-up task is completed.

14. The method of claim 10, wherein when it is determined that completion of the at least one network configuration set-up task is not necessary, the network configuration information is stored.

15. The method according to claim 8, further comprising:
determining whether the displayed existing network configuration information is to be modified.

16. The method according to claim 15, wherein, when it is determined that the displayed at least one network configuration set-up task of the existing network configuration information is to be modified, prompting a user to complete the at least one network configuration set-up task of the existing network configuration information to allow the printer to communicate with the network.

17. A printer comprising:
an interface to check a connection of a network cable to connect the printer to a host computer;
an image formation controller to check a configuration of a network when the network cable is first connected to determine whether there is a factor that needs to be configured to allow the printer to communicate with the network, the factor including at least one of an IP address, a subnet mask, and a gateway, and to configure the factor; and
a display unit to display a screen to configure the factor to allow a user to input a network configuration value of the factor to configure the factor; and
a printing unit to perform a printing operation in response to a command received via the network,
wherein the image formation controller automatically prompts a user of the factor by controlling the display unit to display the factor of existing network configuration information along with a query to inquire whether the user desires to change the at least one network factor on the screen when the image formation controller determines that configuration of the factor is not necessary to allow the printer to communicate with the network and determining whether a request to change the network configuration has been received to allow the user to change the network configuration.

18. The printer according to claim 17, wherein the image formation controller determines whether the displayed factor of the existing network configuration information is to be modified.

19. The printer according to claim 18, wherein, when it is determined that the displayed factor of the existing network configuration information is to be modified, the image formation controller controls the display unit to display the screen to prompt the user to input a network configuration value of the factor to configure the factor.

* * * * *